T. L. SMITH.
WHEELBARROW.
APPLICATION FILED NOV. 12, 1908.

1,020,461.

Patented Mar. 19, 1912.

WITNESSES:

INVENTOR
Thomas L. Smith
BY
Albert E. Smith
ATTORNEY

UNITED STATES PATENT OFFICE.

THOMAS L. SMITH, OF MILWAUKEE, WISCONSIN.

WHEELBARROW.

1,020,461.  Specification of Letters Patent.  Patented Mar. 19, 1912.

Application filed November 12, 1908. Serial No. 462,194.

*To all whom it may concern:*

Be it known that I, THOMAS L. SMITH, a citizen of the United States, residing at Milwaukee, in the county of Milwaukee and State of Wisconsin, have invented a new and useful Improvement in Wheelbarrows, of which the following is a specification.

My invention relates to improvements in wheelbarrows; and the objects of my improvement are to provide a self-lubricating bearing in the wheel hub, to have this bearing as easy running as possible and still have it durable and reasonable in cost. I attain these objects by the device illustrated in the accompanying drawing, in which,—

Figure 1:
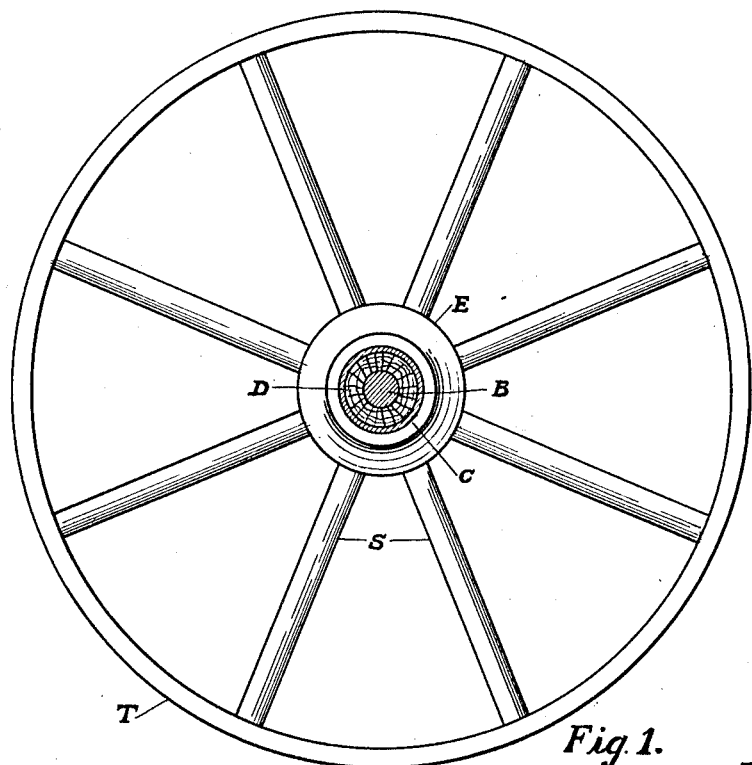
Figure 2:
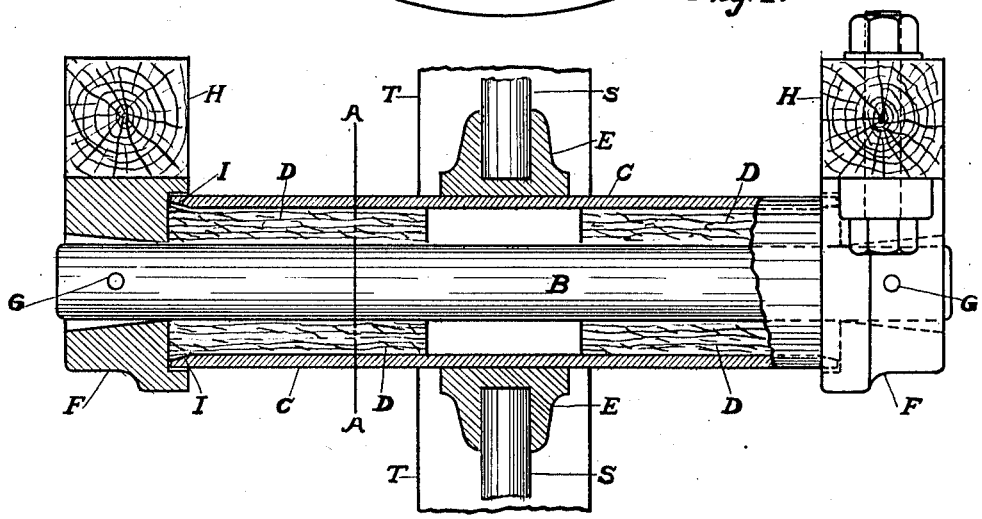

Figure 1 is a side view of the complete wheel, the bearing part of the hub being shown in section taken on the plane A A of Fig. 2. Fig. 2 is a central section taken lengthwise of the wheel hub, a small piece of the hub at the right hand end being shown in full.

Similar letters and figures refer to the same parts throughout the different views.

The tire T is of wrought iron or mild steel, and the spokes S S of the same material are riveted in the tire with a shoulder inside and outside thereof. The hub of the wheel consists of a piece of pipe C, preferably extra heavy pipe, and the spokes S S are joined to the pipe C by a ring of cast iron E, which is cast right on the spokes and on the pipe C. As the ring E cools and shrinks, it grips the pipe C very tightly and places the spokes S S slightly in tension.

The shaft B on which the wheel turns, is made preferably of cold rolled steel, and is secured in the boxes F F by split pins placed in the holes G G. The boxes F F are bolted to the forward ends H H of the barrow frame, which are really extensions of the handles. It will be noted that the boxes F F are formed with a taper hole so that they fit the shaft only on the inner edges.
This construction obviates any bending and springing of the shaft by the boxes F F as they are clamped on the frame H H.

As thus far described, the wheel, the shaft and shaft hangers do not form the subject matter of my present invention, which is concerned only with the bearing in the wheel hub, which will now be described.

The inside surface of the pipe is slightly irregular, having slight ridges and grooves running longitudinally of the pipe, as the result of drawing it over the mandrel. I ream the ends of the pipe to form a taper opening as shown at I I, Fig. 2. D D are bushings of hard wood, preferably hard maple, which are thoroughly treated and filled with a permanent lubricant, as paraffin oil. They are turned and bored to fit the pipe and shaft properly, and are pressed into the pipe by a hydraulic, or other suitable press. The wood should be left projecting slightly from the pipe to take the endwise thrust, and wear against the boxes F F. The uncompressed part of the wood filling the tapered ends of the pipe, will act as a collar or head to prevent the bushing being forced farther into the pipe. These bushings are treated by a quantity of them being placed in a sealed vessel and a vacuum created therein. After the pores and cells of the wood are free of air, the paraffin oil is admitted to the vessel and penetrates the wood thoroughly. As shown in Fig. 2, a space is left in the pipe between the two bushings, which is to be filled with a lubricant and will serve as a reservoir therefor.

In operation, the hard, dry maple thoroughly filled with the paraffin, will develop a glass like surface where it bears on the shaft, and lubricant will be gradually furnished from the reservoir and from the wood itself. I have found this wood bearing, formed as above described, amply strong with its extended bearing surface as shown to support the loads usually carried in barrows, and I have found that the wheel is even easier running than the roller bearing wheel.

What I claim as my invention, and desire to secure by Letters Patent, is,—

1. A vehicle wheel having a metal hub with outwardly tapering openings at each end, wood bushings forced into the hub from each end, and extending slightly beyond the hub, whereby the end wear on the hub is taken on the wood.

2. A vehicle wheel having a metal hub, an enlargement at each end of said hub, a wood bushing forced in each end of the hub and projecting slightly therefrom, a space in the hub between the bushings, the portions of the bushings in the enlargements of the hub being uncompressed, whereby the bushings are maintained in place in the hub.

3. In a wheelbarrow, a traction wheel having a metal tire, spokes, and hub, said hub comprising a relatively long piece of rough pipe connected to the spokes, and bearing surfaces in each end of the pipe consisting of hardwood bushings pressed into the pipe and secured thereto by the interior irregularities of the rough pipe seating themselves in the wood.

THOMAS L. SMITH.

Witnesses:
 EDW. H. ZINN,
 H. H. GERLACH.